US006758253B2

(12) United States Patent
Itoi

(10) Patent No.: US 6,758,253 B2
(45) Date of Patent: Jul. 6, 2004

(54) PNEUMATIC TIRE WITH SPIRALLY WOUND REINFORCING CORD LAYER

(75) Inventor: Yohei Itoi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/756,880

(22) Filed: Jan. 10, 2001

(65) Prior Publication Data

US 2001/0010246 A1 Aug. 2, 2001

(30) Foreign Application Priority Data

Jan. 14, 2000 (JP) .......................................... 2000-005640

(51) Int. Cl.$^7$ .......................... B60C 13/00; B60C 15/00; B60C 15/06
(52) U.S. Cl. ........................ 152/543; 152/539; 152/546; 152/547; 152/555
(58) Field of Search ................................ 152/543, 542, 152/539, 555, 546, 547

(56) References Cited

U.S. PATENT DOCUMENTS

| 3,904,463 A | | 9/1975 | Boileau |
| 5,529,104 A | | 6/1996 | Delias et al. |
| 5,772,811 A | * | 6/1998 | Ueyoko et al. ......... 152/546 X |

FOREIGN PATENT DOCUMENTS

| EP | 0 715 977 A2 | 6/1996 | |
| FR | 1 234 995 | 5/1960 | |
| FR | 2 055 988 | 5/1971 | |
| JP | 02234812 A | * 9/1990 | ................. 152/555 |
| JP | 04278810 A | * 10/1992 | ................. 152/555 |
| JP | 05246210 A | * 9/1993 | |
| JP | 08091026 A | * 4/1996 | |
| JP | 09086110 A | * 3/1997 | |
| JP | 09193624 A | * 7/1997 | |
| JP | 09193625 A | * 7/1997 | |
| JP | 10044721 A | * 2/1998 | |
| JP | 10193925 A | * 7/1998 | |
| JP | 10230714 A | * 9/1998 | |

OTHER PUBLICATIONS

Burton, Walter E. The Story of Tire Beads and Tires. New York, McGraw–Hill Book Company, Inc., 1954. p. 3.*
Clark, Samuel K., ed. Mechanics of Pneumatic Tires. U.S. Department of Transportation, 1981. p. 881.*
Patent Abstracts of Japan, vol. 011, No. 213, Jul. 10, 1987 (M–605), & JP 62–029403A, The Yokohama Rubber Co. Ltd, Feb. 7, 1987.

* cited by examiner

*Primary Examiner*—Adrienne C. Johnstone
(74) *Attorney, Agent, or Firm*—Sughrue Mion, PLLC

(57) ABSTRACT

A pneumatic tire comprises a tread portion, a pair of sidewall portions, a pair of bead portions, a radial carcass extending between a pair of bead cores and having a turnup portion, a bead filler rubber, and one or more reinforcing cord layers arranged at a side face zone ranging from the bead portion to the sidewall portion, in which the reinforcing cord layer is a layer of one or more rubberized cords spirally wound about an axial line of the tire and has an inner end in a radial direction of the tire between a position located outward from an outer periphery of the bead core in the radial direction and a position located inward from a tapered end of the bead filler rubber in the radial direction.

10 Claims, 5 Drawing Sheets

PNEUMATIC TIRE WITH SPIRALLY WOUND REINFORCING CORD LAYER

BACKGROUND OF THE INVENTION

1. Filed of the Invention

This invention relates to pneumatic tires, and more particularly to a pneumatic radial tire for use in relatively small-size vehicles such as passenger cars, vans, pickups and the like simultaneously improving steering stability, road noise (hereinafter abbreviated as R/N) performance and ride comfort while dominantly holding tire weight, rolling resistance and the like.

2. Description of Related Art

In the pneumatic tires for automobiles, particularly tires for use in relatively small-size vehicles as mentioned above, it is demanded to improve various performances such as steering stability, ride comfort, indoor noise performance, fuel consumption (rolling resistance) and so on. Recently, it tends to more enhance the demand for simultaneously and highly improving the performances.

As regards such a demand, means for separately improving each of the performances is established as mentioned below. That is, there are the following means:

(1) means for improving steering stability: ensuring of cornering power, increase of tire rigidity, increase of hysteresis loss in tread rubber (2) means for improving ride comfort and R/N performance: reduction of tire rigidity (3) means for reducing weight and improving rolling resistance: reduction of tire rigidity, decrease of hysteresis loss in tread rubber As mentioned above, it is possible to improve the individual performances. However, the means for improving the steering stability and the means for improving the ride comfort and R/N performance are quite conflicting with each other, so that it is obliged to adopt a temporary means such as gauge adjustment of tread rubber or the like in the present circumstances.

On the other hand, as the means for improving the steering stability without so degrading the ride comfort, there is proposed such a structure that a bottom width is made narrower and a height is made lower in a hard bead filler rubber and also a sheet-shaped rubber member having a hardness equal to that of the bead filler rubber is overlapped with the bead filler rubber at a top end portion thereof. Even in this means, the tire rigidity somewhat rises, so that there is still a problem that the ride comfort enough to satisfy the demand can not be obtained.

SUMMARY OF THE INVENTION

It is, therefore, an object of the invention to provide a pneumatic tire simultaneously and drastically improving the steering stability, ride comfort and R/N performance while ensuring at least an existing tire weight and holding an existing low rolling resistance.

According to the invention, there is the provision of a pneumatic tire comprising a tread portion, a pair of sidewall portions, a pair of bead portions, a radial carcass extending between a pair of bead cores embedded in the respective bead portion to reinforce these portions and having a turnup portion wound around the bead core from an inside of the tire toward an outside thereof, a bead filler rubber of a triangular shape at section taperingly extending from the bead core toward an end of the tread portion, and one or more reinforcing cord layers arranged at a side face zone ranging from the bead portion to the sidewall portion, in which the reinforcing cord layer is a layer of one or more rubberized cords spirally wound about an axial line of the tire and has an inner end in a radial direction of the tire between a position located outward from an outer periphery of the bead core in the radial direction and a position located inward from a tapered end of the bead filler rubber in the radial direction.

In a preferable embodiment of the invention, the inner end of the reinforcing cord layer is located in a position separated from the outer periphery of the bead core by a distance in the radial direction corresponding to 3–50% of a tire section height.

In another preferable embodiment of the invention, an outer end of the reinforcing cord layer in the radial direction is located in a position separated from a rim diameter line by a distance in the radial direction corresponding to 10–75% of a tire section height.

In the other preferable embodiment of the invention, the cord of the reinforcing cord layer is a cord selected from nylon cord, polyester cord, rayon cord, aramid cord and steel cord.

In a further preferable embodiment of the invention, the reinforcing cord layer has an end count of 15–60 cords/5 cm.

In a still further preferable embodiment of the invention, the bead filler rubber has a JIS hardness at 30° C. of 65–83.

In the other preferable embodiment of the invention, an end of the turnup portion of the radial carcass has a height in the radial direction corresponding to 5–45% of the tire section height.

In a further preferable embodiment of the invention, the reinforcing cord layer is arranged along an outside of the turnup portion of the radial carcass or along an inside of the turnup portion of the radial carcass.

In a still further preferable embodiment of the invention, an outer end of the reinforcing cord layer in the radial direction exceeds an end of the turnup portion of the radial carcass in the radial direction.

In another preferable embodiment of the invention, a reinforcing sheet rubber extending toward the end of the tread portion is arranged along a tapered end portion of the bead filler rubber so as to contact therewith and has an even thickness of not more than 2 mm.

In the other preferable embodiment of the invention, an outer end of the reinforcing sheet rubber in the radial direction is located in a position separated from the rim diameter line to 30–75% of the tire section height.

The term "tire section height" used throughout the specification means "a half of a difference between an overall diameter of a tire and a rim diameter when the tire is mounted onto an approved rim and inflated under a specified air pressure without loading" as defined in JATMA YEAR BOOK (1999). And also, the term "rim diameter line" used herein means a straight line passing through a position corresponding to a rim diameter and in parallel to an axial line of the tire. Furthermore, the term "JIS hardness" used herein means a hardness of rubber measured according to JIS K6253-1993.

BRIEF DESCRIPTION OF THE DRAWINGS

The invention will be described with reference to the accompanying drawings, wherein.

DETAILED DESCRIPTION OF THE INVENTION

Figure 1:
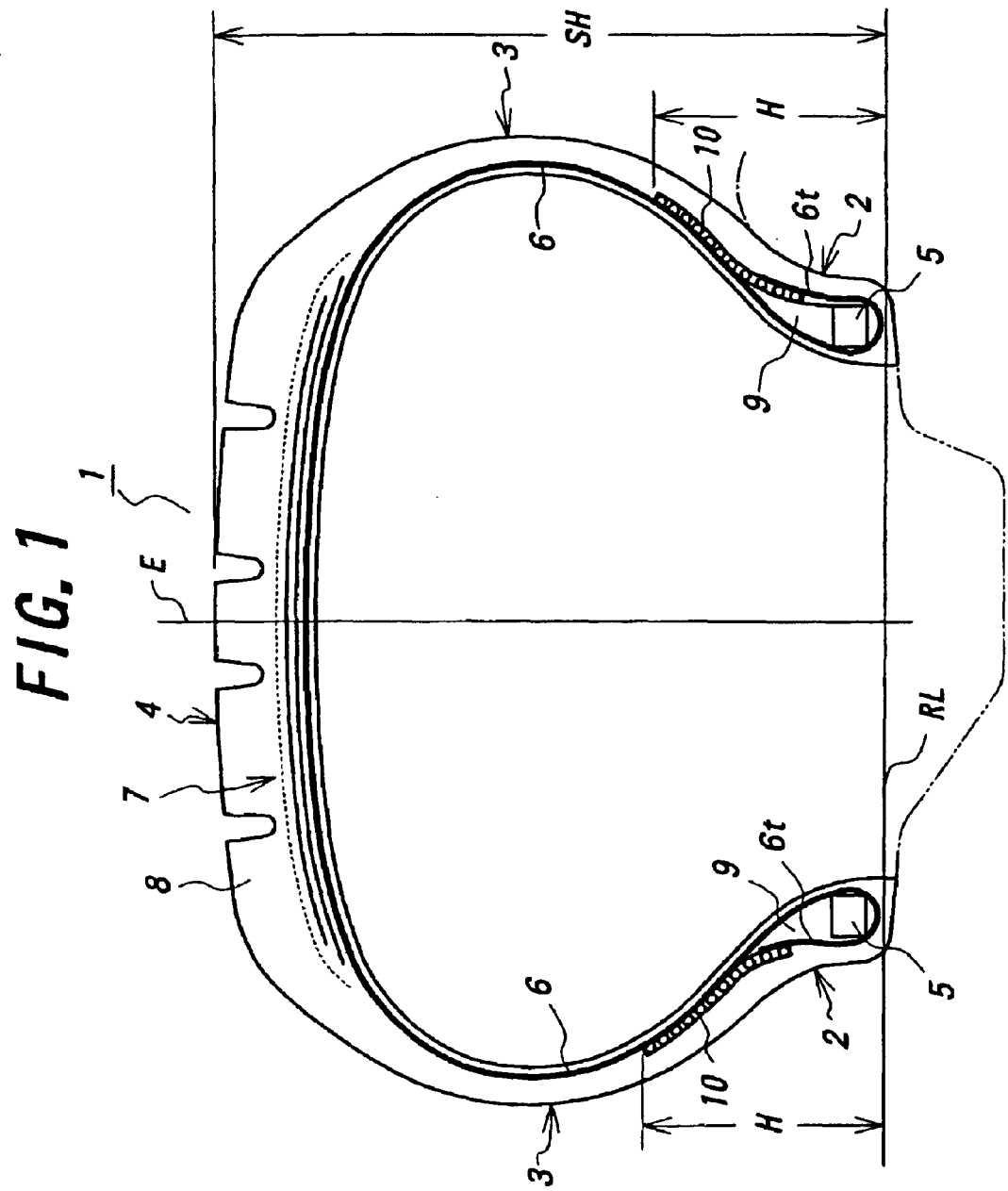
FIG. 1 is a diagrammatically section view of an embodiment of the pneumatic tire according to the invention.

A tire 1 shown in FIG. 1 is a pneumatic radial tire for use in relatively small-size vehicles as previously mentioned. This tire 1 comprises a pair of bead portions 2, a pair of sidewall portions 3 and a tread portion 4. These portions 2, 3, 4 are reinforced with a radial carcass 6 of one or more plies, one ply in the illustrated embodiment, extending between a pair of bead cores 5 each embedded in the respective bead portion 2. Furthermore, the tread portion 4 is strengthened with a belt 7 disposed on an outer periphery of the radial carcass 6. And also, the tread portion 4 is provided with a tread rubber 8 disposed at an outer peripheral side of the belt 7.

The radial carcass 6 has a turnup portion 6t wound around the bead core 5 from an inside of the tire 1 toward an outside thereof. As a ply cord of the radial carcass 6, use may be made of organic fiber cords such as nylon cord, polyester cord, rayon cord, aramid cord and the like, inorganic fiber cords such as carbon fiber cord and the like, and steel cord. Furthermore, the bead portion 2 is provided with a bead filler rubber 9 taperingly extending from the bead core 5 toward an end of the tread portion 4 and having a triangular shape at its section.

Figure 2:
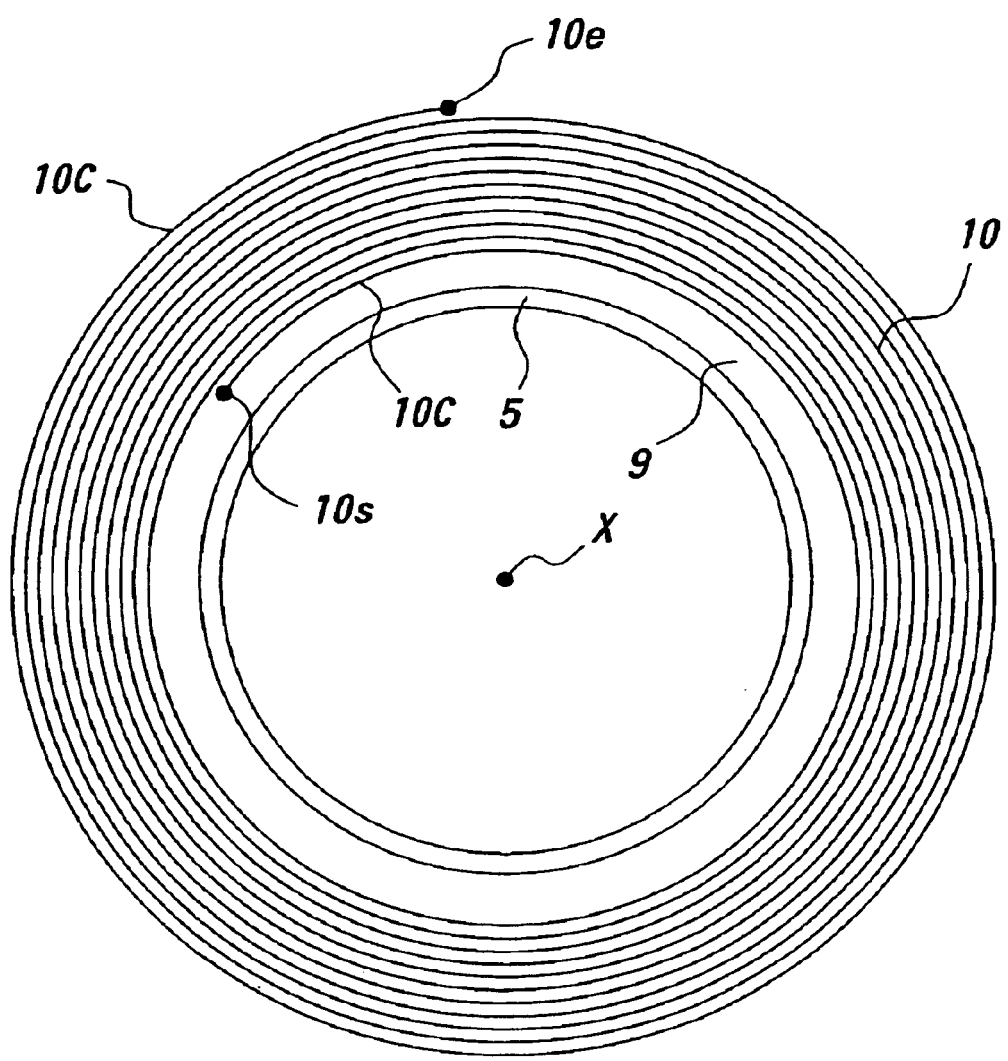
FIG. 2 is a schematically perspective side view illustrating a spirally wound cord layer according to the invention and a part of other tire constructional members.

Referring to FIGS. 1 and 2, the tire 1 is provided with one or more reinforcing cord layers, one reinforcing cord layer 10 in the illustrated embodiment, disposed in a side face zone ranging from the bead portion 2 to the sidewall portion 3. As shown in FIG. 2, the reinforcing cord layer 10 is a cord layer formed by spirally winding one or more rubberized cords, one rubberized cord 10C in the illustrated embodiment, about an axial line X of the tire 1. For convenience' sake, adjoining rubberized cords 10C ranging from a winding start end 10s to a winding terminal end 10e are shown so as to separate from each other in FIG. 2, but these adjoining rubberized cords 10C are actually joined to each other at least in the tire 1 to form a completely layer-shaped cord layer 10.

Figure 3:
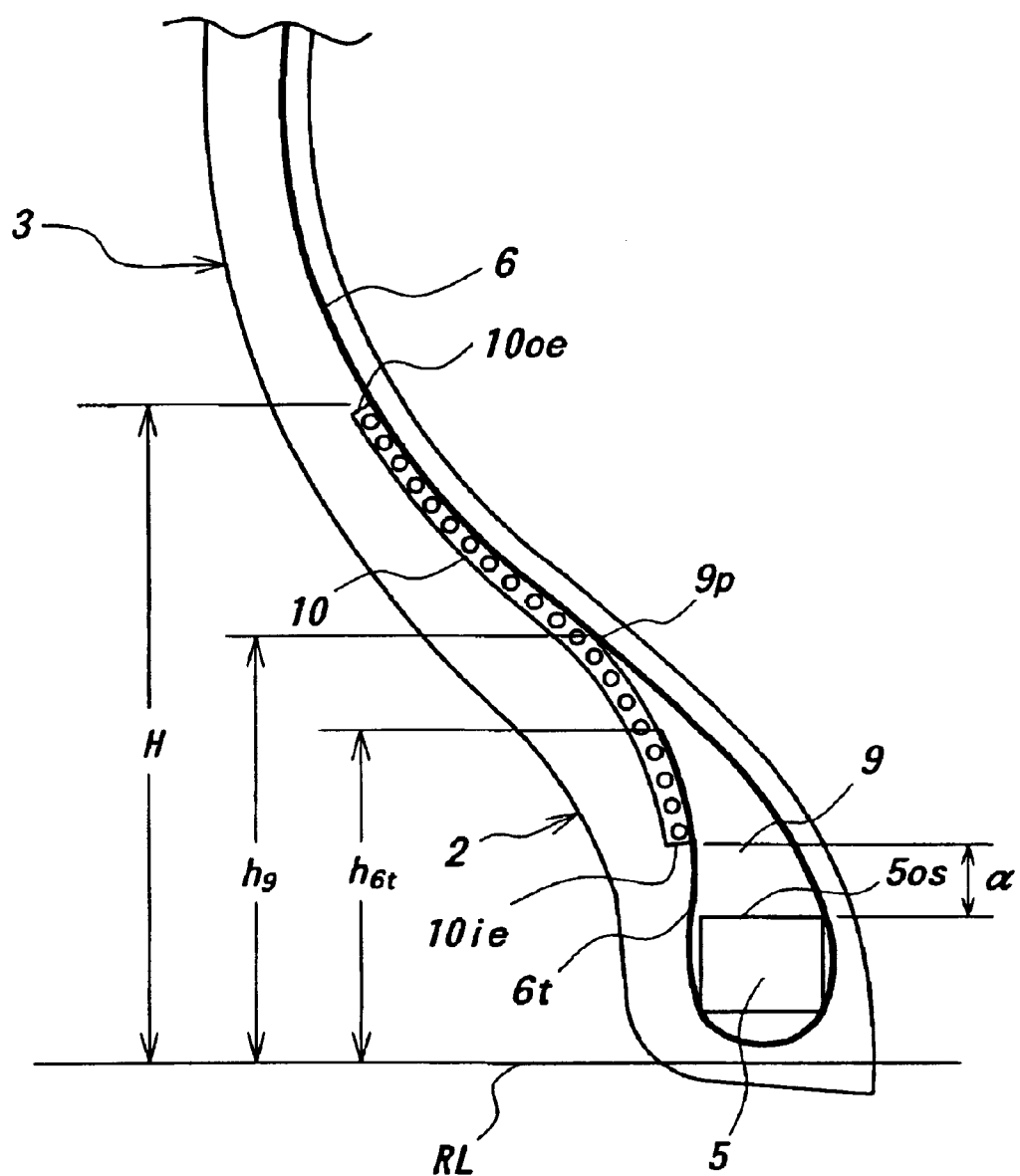
FIG. 3 is a diagrammatically section view of a main part enlargedly shown in a left half of the tire in FIG. 1.
Figure 4:
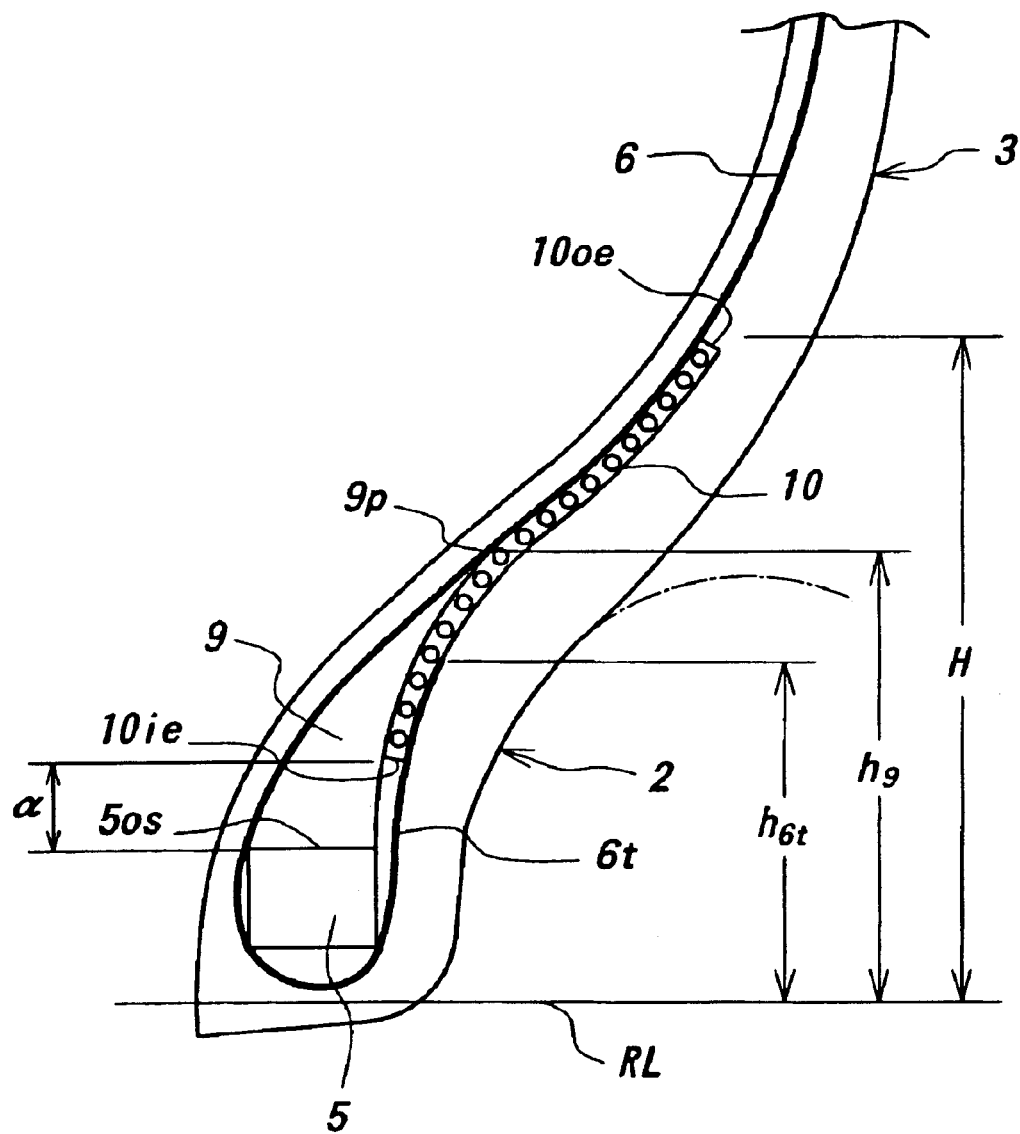
FIG. 4 is a diagrammatically section view of a main part enlargedly shown in a right half of the tire in FIG. 1.
Figure 5:
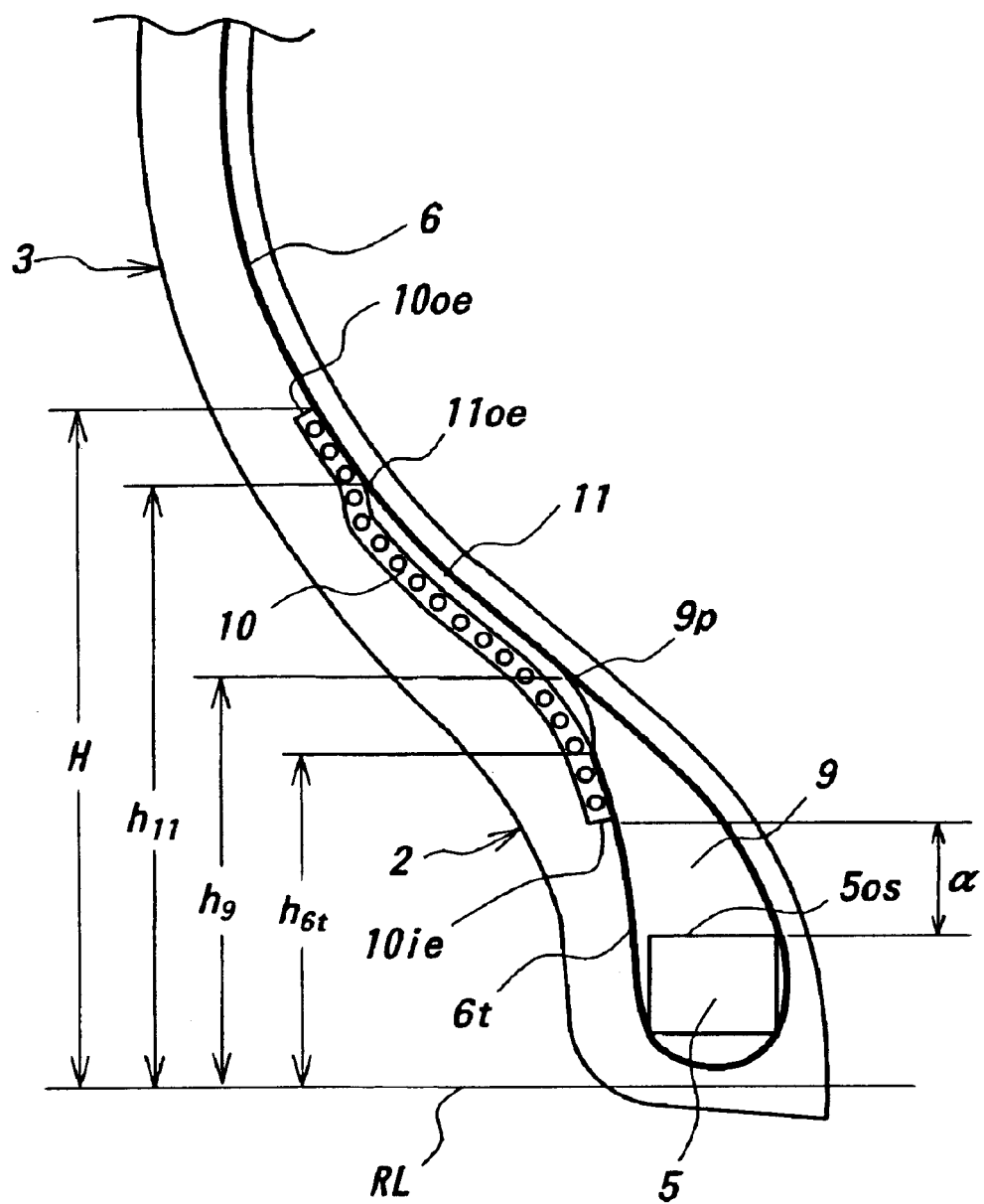
FIG. 5 is a diagrammatically section view of a main part illustrating a modified embodiment of the tire in FIG. 1.

Referring to FIGS. 3 to 5, the spirally wound cord layer as the reinforcing cord layer 10 has an inner end 10ie existing between a position located outward from an outer periphery 5os of the bead core 5 in a radial direction of the tire and a position located inward from a tapered end 9p of the bead filler rubber 9 in the radial direction of the tire.

At first, viewing ride comfort and R/N performance from a point of tire mechanism, (1) an impact force is input from irregular portions of a road surface to the tread portion 4 contacted with the road surface during the running of the tire 1 under loading, (2) the impact force is transmitted through the tread rubber 8 to the belt 7 to oscillate the belt 7, (3) such an oscillation of the belt 7 is transmitted from the sidewall portion 3 through the bead portion 2 to a rim (shown by a phantom line in FIG. 1), and (4) the rim is oscillated to vibrate a vehicle, so that a greater or lesser acceleration rate of such a vibration results in qualities of the ride comfort and R/N performance.

Then, the quality of the steering stability is not determined by the degree of the tire whole rigidity but is determined by degrees of a rigidity of a side face zone ranging from the bead portion 2 to the sidewall portion 3 and a rigidity of the tread portion 4. Particularly, the rigidity of the side face zone plays an important role for the steering stability and consists of a lateral rigidity component substantially perpendicular to a running direction of the tire 1 and a rigidity component in the running direction or longitudinal direction, which depend the quality of the steering stability. By enhancing the lateral rigidity component and the rigidity component in the longitudinal direction is improved the steering stability.

By using the spirally wound cord layer as the reinforcing cord layer 10 can be obtained functions and effects (1) to (3) as mentioned below.

(1) Since one or more reinforcing cord layers 10 arranged in each of the side face zones are the cord layer formed by spirally winding the rubberized cord 10C, the rigidity of the side face zone at a ground contact area under loading in upper and lower directions (radial direction) can be made lower than the radial rigidity of the side face zone using the conventional high-hardness reinforcing rubber layer.

Therefore, the side face zone using the spirally wound cord layer as the reinforcing cord layer 10 more increases a flexing degree as compared with the side face zone using the conventional high-hardness reinforcing rubber layer to more improve an ability absorbing oscillation transmitted from the belt 7, whereby a transmission rate of oscillation to the bead portion can be reduced to more improve the ride comfort and R/N performance. In this case, it is important to block oscillation of the spirally wound cord 10C from the bead core 5 by separating away the inner end 10ie of the spirally wound cord layer from the bead core 5 having a nature close to a rigid body. Moreover, R/N is represented by an overall decibel (A) value.

(2) On the other hand, a large tension is applied to the spirally wound cord 10C of the reinforcing cord layer 10 in the ground contact area of the tire 1 inflated under a given internal pressure to enhance the rigidity of the cord 10C itself and hence the rigidity of the side face zone along the arranging direction of the cord 10C in the longitudinal direction is increased and at the same time the lateral rigidity of the side face zone is increased, whereby the cornering power of the tire 1 is largely increased to improve the steering stability. In this case, the inner end 10ie of the spirally wound cord layer is effective to be located inward in the radial direction within a range satisfying the above condition as far as possible, so that the inner end 10ie is located inward from the tapered end 9p of the bead filler rubber 9 in the radial direction. Thus, it is drastically attained to simultaneously establish the steering stability and the ride comfort and the R/N performance.

(3) Finally, the rolling resistance is created by a hysteresis loss of a viscoelastic body, primarily rubber and secondarily organic fiber cord through repetitive ground contacting deformation of the tire 1 during the running under loading, and such a loss is converted into heat. In this connection, an outer rubber of the sidewall portion 3 has a property of low hysteresis loss, and the organic fiber cord or inorganic fiber cord has a property of a considerably lower hysteresis loss.

Since the rigidity in the upper and lower directions of the side face zone including the reinforcing cord layer 10 is lower than the rigidity of the side face zone including the conventional high-hardness reinforcing rubber layer, the side face zone including the reinforcing cord layer 10 at the ground contact area of the tread portion 4 increases a deformation quantity expanding outward from the tire 1 as compared with the conventional one. In other words, the ground contacting deformation is absorbed at the low hysteresis loss region and hence the rolling resistance is at least reduced as compared with that of the conventional tire. For this end, a height $h_9$ of the tapered end 9p of the bead filler rubber 9 from a rim diameter line RL is not more than 50% of a section height SH of the tire 1.

In addition, the organic fiber cord or inorganic fiber cord has a specific gravity smaller than that of rubber, so that the weight of the tire 1 can be controlled to a level equal to or less than that of the conventional tire.

As mentioned above, the arrangement of the spirally wound cord layer as the reinforcing cord layer 10 in the side face zone of the tire 1 is based on the utilization of anisotropic property, which can not be obtained in the high-hardness bead filler rubber 9 or high-hardness sheet-shaped rubber, i.e. a property that the rigidity in the longitudinal direction of the tire 1 is high and the rigidity in the radial direction is low, whereby the steering stability can be largely improved with rather improving the ride comfort and R/N performance, which have been sacrificed in the conventional technique.

The invention will be described in detail with respect to the reinforcing cord layer 10, bead filler rubber 9 and turnup portion 6t below.

As shown in FIGS. 3–5, the inner end 10ie of the reinforcing cord layer 10 is located in a position separated from the outer periphery of the bead core 5 by a distance α in the radial direction corresponding to 3–50%, preferably 30–50% of a section height SH of the tire 1. And also, as shown in FIGS. 1 and 3–5, an outer end 10oe of the reinforcing cord layer 10 in the radial direction is located in a position separated from a rim diameter line RL by a distance H in the radial direction corresponding to 10–75%, preferably 50–75% of the section height SH of the tire 1. When the distance H is outside the above range, the improvements of the steering stability, ride comfort and R/N performance are obstructed.

In the reinforcing cord layer 10, the cord 10C is selected from nylon cord, polyester cord, rayon cord, aramid cord and steel cord. The selection from these cords is dependent upon the requirement of steering stability, ride comfort and R/N performance.

Then, the end count of the spirally wound cord 10C in the reinforcing cord layer 10 is 15–60 cords/5 cm. The term "end count" used herein means the number of cords 10C per unit length measured in a direction perpendicular to an axial line of the cord, 5 cm in the invention. The end count is set by the kind of the cord 10C in conjunction with the above performances.

The bead filler rubber 9 has a JIS hardness at 30° C. of 65–83, preferably 70–80. When the hardness is outside the above range, the simultaneous improvement of the steering stability, ride comfort and R/N performance is obstructed.

Then, the height $h_{6t}$ of the turnup portion 6t of the radial carcass 6 from the rim diameter line RL in the radial direction is 5–45% of the section height SH of the tire 1. When the height $h_{6t}$ is outside the above range, the simultaneous improvement of the steering stability, ride comfort and R/N performance is obstructed.

The reinforcing cord layer 10 may be arranged along an outside of the turnup portion 6t of the radial carcass 6 as shown in a left half of FIG. 1 with respect to an equatorial plane E of the tire and FIGS. 3 and 5, or along an inside of the turnup portion 6t of the radial carcass 6 as shown in a right half of FIG. 1 with respect to the equatorial plane E and FIG. 4. Moreover, for convenience' sake, FIG. 1 shows a mixed use of these arrangements, but a case of arranging only outside the turnup portion 6t and a case of arranging only inside the turnup portion 6t may be used. When the reinforcing cord layer 10 is arranged outside the turnup portion 6t, the bead portion durability is improved, while when it is arranged inside the turnup portion 6t, the bead portion durability somewhat lowers, but the building efficiency becomes higher because a composite material formed by previously uniting an uncured member for the bead filler rubber 9 with an uncured member for the reinforcing cord layer 10 can be used at a tire building stage.

The outer end of the reinforcing cord layer 10 in the radial direction corresponding to the distance H exceeds the height $h_{6t}$ of the turnup portion 6t of the radial carcass in the radial direction, i.e. H>$h_{6t}$. If H≦$h_{6t}$, stress and strain concentrate in the end part of the turnup portion 6t and hence there is caused a problem that troubles are started from such an end part to lower the bead portion durability.

As a modified embodiment of the invention, a reinforcing sheet rubber 11 extending toward the end of the tread portion 4 is arranged along an end portion of the bead filler rubber 9 inclusive of the tapered end 9p so as to contact therewith as shown in FIG. 5. The reinforcing sheet rubber has an even thickness of not more than 2 mm, preferably 0.3–1.0 mm. A height $h_{11}$ of an outer end 11oe of the reinforcing sheet rubber 11 in the radial direction is within a range of 30–75%, preferably 45–60% of the section height SH of the tire 1. Such a structure is adaptable for preceding the steering stability over the ride comfort and R/N performance.

The following examples are given in illustration of the invention and are not intended as limitations thereof.

There are provided radial ply tires for passenger car of Examples 1 and 2 having a tire size of 195/65R15 and a structure as shown in FIG. 1. In the tire of Example 1, each reinforcing cord layer 10 is located outside the turnup portion 6t as shown in FIG. 3. In the tire of Example 2, each reinforcing cord layer 10 is located inside the turnup portion 6t as shown in FIG. 4.

The inner end 10ie of the reinforcing cord layer 10 in the radial direction is located at 5 mm inward from the tapered end 9p of the bead filler rubber 9 in the radial direction. Nylon cord is used as the spirally wound cord 10C in the reinforcing cord layer 10. The end count is 45 cords/5 cm. Moreover, the section height SH of the tire is 128 mm.

There are provided tires of Conventional Examples 1–3 having the same structure as in Examples 1–2 except that a part of the height $h_9$ of the bead filler rubber 9 and the reinforcing cord layer 10 are omitted. In the tire of Conventional Example 3, the same rubber sheet as the bead filler rubber having a thickness of 1 mm is particularly arranged at a height of 30 mm from the same position of the inner end 10ie in the radial direction as in Examples 1 and 2.

And also, there is provided a tire of Comparative Example using the same reinforcing cord layer 10 and having the same structure as in Examples 1 and 2 except that the inner end 10ie of the reinforcing cord layer 10 in the radial direction is located on an intersect between a straight line passing through the center of gravity at a pattern section of the bead core 5 and in parallel to the rim diameter line RL and an outer side face of the bead core 5.

With respect to the tires of Examples 1–2, Conventional Examples 1–3 and Comparative Example, tire dimensions are shown in Table 1. In Table 1, the bead filler rubber 9 is abbreviated as BF rubber.

Each of these tires is subjected to an indoor test and an actual running test. In the indoor test, a tire weight is firstly measured. The measured results are represented by an index on the basis that the tire of Conventional Example 1 is 100, in which the smaller the index value, the lighter the weight. Then, the rigidity in the radial direction is represented by a vertical stiffness, and the lateral rigidity is represented by a lateral stiffness, and the rigidity in the longitudinal direction is represented by a longitudinal stiffness, and these stiffnesses are measured. The measured results are represented by an index on the basis that the stiffness of Conventional Example 1 is 100, in which the larger the index value, the higher the rigidity. Next, the rolling resistance is measured and the measured value is divided by a load to obtain a coefficient of rolling resistance. The coefficient of rolling resistance is represented by an index on the basis that Conventional example 1 is 100, in which the larger the index value, the better the rolling resistance. These index values are shown in Table 1.

In the actual running test, the vehicle is run on a given test course by a professional test driver to evaluate the steering stability and ride comfort by the driver's feeling, in which a point adding-decreasing system is adopted within a range of ±5 on the basis that the tire of Conventional Example 1 is a standard point (zero), in which the larger the adding point, the better the performance. As regard R/N performance, indoor noise during the running on R/N generating road surface is measured as an overall value of dB(A), in which values of plus dB(A) and minus dB(A) are calculated on the basis that the tire of Conventional Example 1 is standard and the larger the minus dB(A) value, the better the R/N performance. These results are also shown in Table 1.

also, the steering stability is considerably improved as compared with the tire of Conventional Example 2 and the rolling resistance is equal thereto. Further, the steering stability, ride comfort and R/N performance are improved and also the rolling resistance is considerably improved as compared with the tire of Conventional Example 3. In the tire of Comparative Example, the steering stability is considerably lowered as compared with the tire of Conventional Example 1, which shows that the use of the reinforcing cord layer 10 is meaningless.

As mentioned above, according to the invention, there can be provided a pneumatic tire capable of drastically improving the steering stability, ride comfort and R/N performance while maintaining the weight equal to the conventional light-weight tire and an excellent rolling resistance.

What is claimed is:

1. A pneumatic tire for use in four-wheeled vehicles comprising:
   a tread portion,
   a pair of sidewall portions,
   a pair of bead portions,
   a radial carcass extending between a pair of bead cores embedded in the respective bead portions to reinforce these portions and having a turnup portion wound around each bead core from an inside of the tire toward an outside thereof,
   a bead filler rubber of a triangular shape at section taperingly extending from the bead core toward an end of the tread portion and having a JIS hardness at 30° C. of 65–83,
   a reinforcing cord layer arranged at a side face zone ranging from the bead portion to the sidewall portion,

TABLE 1

|  |  | Conventional Example | | | Comparative Example | Example | |
| --- | --- | --- | --- | --- | --- | --- | --- |
|  | Items | 1 | 2 | 3 | Example | 1 | 2 |
| Structure | Height of BF rubber (index) | 100 | 50 | 50 | 50 | 50 | 50 |
|  | JIS hardness (30° C.) of BF rubber | 80 | 80 | 80 | 80 | 80 | 80 |
|  | Reinforcing cord layer 10 | absence | absence | absence | presence | presence | presence |
|  | Height H of reinforcing cord layer 10 (mm) | — | — | — | 30 | 50 | 50 |
|  | Height $h_{6t}$ of turnup portion (mm) | 68 | 20 | 20 | 20 | 20 | 20 |
| Indoor test | Tire weight (index) | 100 | 97 | 99 | 99 | 99 | 99 |
|  | Vertical stiffness (index) | 100 | 92 | 95 | 93 | 93 | 93 |
|  | Lateral stiffness (index) | 100 | 91 | 96 | 92 | 93 | 91 |
|  | Longitudinal stiffness (index) | 100 | 90 | 102 | 104 | 105 | 104 |
|  | Coefficient of rolling resistance (index) | 100 | 104 | 101 | 104 | 104 | 104 |
| Actual running test | Steering stability (evaluating point) | standard | −4 | ±0 | −2 | +1 | +2 |
|  | Ride comfort (evaluating point) | standard | +3 | +1 | +3 | +2 | +1 |
|  | R/N performance (dB (A)) | standard | 0.6 | −0.2 | −0.5 | −0.7 | −0.6 |

As seen from the results of Table 1, in the tires of Examples 1 and 2, the steering stability, ride comfort and R/N performance are considerably improved and the rolling resistance is also improved and the weight is reduced as compared with the tire of Conventional Example 1. And in which the reinforcing cord layer is a layer of one or more rubberized cords spirally wound about an axial line of the tire and has an inner end in a radial direction of the tire between a position located outward from an outer periphery of the bead core in the radial direction and a position located inward from a tapered end of the bead filler rubber in the radial direction, and a reinforcing sheet rubber extending toward the end of the tread portion and arranged along a tapered end portion of the bead filler rubber so as to contact therewith and having an even thickness of not more than 2 mm and a hardness substantially equal to that of said bead filler rubber.

2. A pneumatic tire according to claim 1, wherein the inner end of the reinforcing cord layer is located in a position separated from the outer periphery of the bead core by a distance in the radial direction equal to 3–50% of a tire section height.

3. A pneumatic tire according to claim 1, wherein an outer end of the reinforcing cord layer in the radial direction is located in a position separated from a rim diameter line by a distance in the radial direction equal to 10–75% of a tire section height.

4. A pneumatic tire according to claim 1, wherein the cord of the reinforcing cord layer is a card selected from nylon cord, polyester cord, rayon cord, aramid cord and steel cord.

5. A pneumatic tire according to claim 1, wherein the reinforcing cord layer has an end count of 15–60 cords/5 cm.

6. A pneumatic tire according to claim 1, wherein an end of the turnup portion of the radial carcass has a height in the radial direction equal to 5–45% of the tire section height.

7. A pneumatic tire according to claim 1, wherein the reinforcing cord layer is arranged along an outside of the turnup portion of the radial carcass.

8. A pneumatic tire according to claim 1, wherein the reinforcing cord layer is arranged along an inside of the turnup portion of the radial carcass.

9. A pneumatic tire according to claim 1, wherein an outer end of the reinforcing cord layer in the radial direction exceeds an end of the turnup portion of the radial carcass in the radial direction.

10. A pneumatic tire according to claim 1, wherein an outer end of the reinforcing sheet rubber in the radial direction is located in a position separated from the rim diameter line to 30–75% of the tire section height.

\* \* \* \* \*